United States Patent [19]
Bianchi et al.

[11] Patent Number: 4,756,576
[45] Date of Patent: Jul. 12, 1988

[54] ADJUSTABLE SEAT STRUCTURE FOR A MOTOR VEHICLE

[75] Inventors: François Bianchi, Valentigney; Alain Duval, Mandeure; Francois Fourrey, Montbeliard, all of France

[73] Assignee: Cycles Peugeot, Valentigney, France

[21] Appl. No.: 30,516

[22] Filed: Mar. 27, 1987

[30] Foreign Application Priority Data

Mar. 28, 1986 [FR] France .................. 86 04569

[51] Int. Cl.⁴ ............................................. A47C 1/02
[52] U.S. Cl. ................................ 297/325; 297/361; 248/396
[58] Field of Search .............. 297/330, 361, 325, 338, 297/339; 248/394, 396

[56] References Cited

U.S. PATENT DOCUMENTS

| | | | |
|---|---|---|---|
| 2,783,826 | 3/1957 | Haltenberger | 297/361 |
| 3,001,756 | 9/1961 | Saffer | 248/394 |
| 3,182,947 | 5/1965 | Tanaka | 248/396 |
| 3,765,720 | 10/1973 | Sakai | 297/330 |
| 4,218,091 | 8/1980 | Webster | 297/361 |
| 4,387,874 | 6/1983 | Boisset | 248/396 |
| 4,445,661 | 5/1984 | Langmesser et al. | 248/394 |
| 4,616,874 | 10/1986 | Pietsch et al. | 297/330 |

FOREIGN PATENT DOCUMENTS 636325 3/1962 Italy .................. 297/361

Primary Examiner—Francis K. Zugel
Attorney, Agent, or Firm—Sughrue, Mion, Zinn, Macpeak, and Seas

[57] ABSTRACT

The seat structure comprises a seat framework (2) and a backrest framework (6) which are pivotally interconnected by a pivot pin (4) which is movable in a substantially vertical curved opening (40). The framework of the backrest is extended by tabs (34) which are connected in their lower part by a link (32) to an element pivotally mounted on a pin (18) which is movable in a vertical opening (20). Owing to the fact that the pin (18) is carried by the seat, the adjustments in height and in inclination are strictly independent.

10 Claims, 5 Drawing Sheets

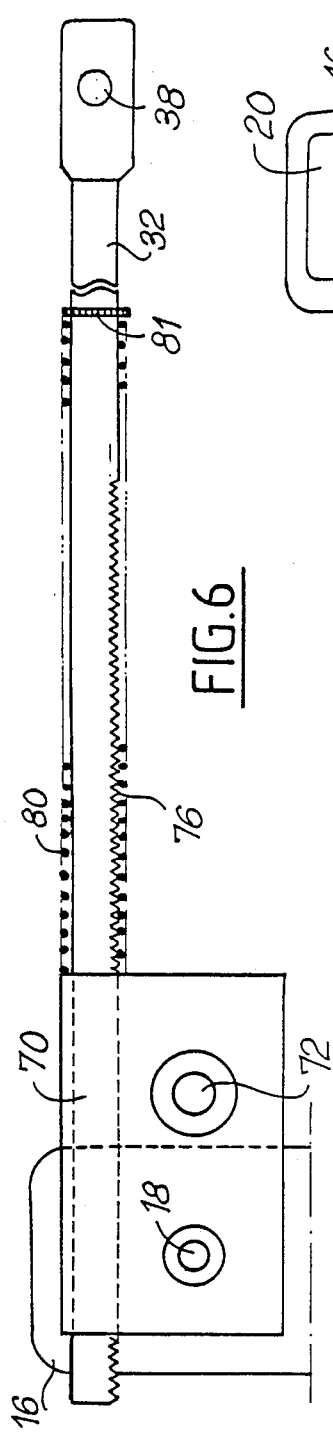
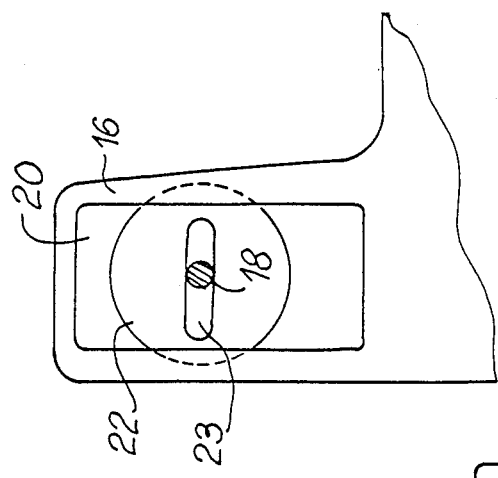
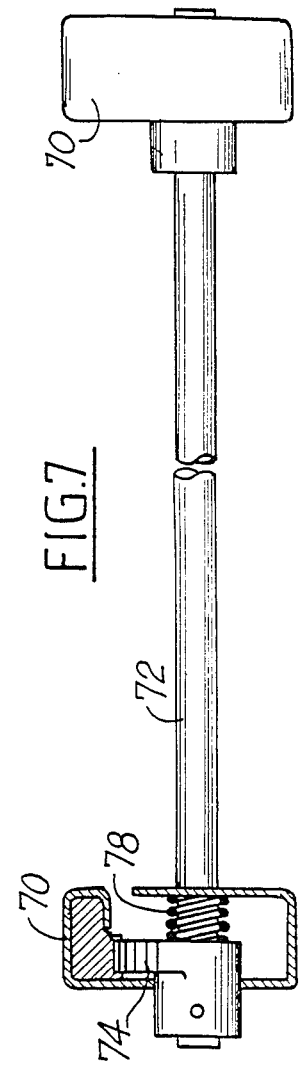
FIG.5
FIG.6
FIG.7

ADJUSTABLE SEAT STRUCTURE FOR A MOTOR VEHICLE

A very large number of types of device exist at the present time which permit the adjustment of the position of seat structures in inclination, height or even longitudinally. These devices are increasingly perfected and rendered automatic, but an important problem however remains for the user since the various displacements of the seat and backrest interfere with each other and make it difficult to find the desired optimum position.

An object of the present invention is to overcome this drawback by providing a seat structure whose different parts can be adjusted in a completely independent manner without resulting in a modification of the preceding adjustment.

This invention indeed provides a seat structure whose framework of the backrest is pivotally mounted on the framework of the seat and connected at its lower end to means for adjusting the inclination of the backrest, in which the lower end of the framework of the backrest is connected to a pivotal element mounted on the seat by means of a pivot pin while the pin pivotally mounting the backrest on the seat extends through an opening which is substantially vertical but slightly curved and is provided in a support side wall, so that the displacement of the pivotal connection between the seat and the backrest in the opening and the piviting of the backrest around its pivot pin are two completely independent movements.

According to a preferred embodiment the pivotal element connected to the backrest is pivotally mounted on a plate which is vertically movable and guided in a vertical opening in the support side wall.

In such a seat structure, the vertical displacement of the front or the rear of the seat, or the swinging of the backrest causes a displacement of the element carried by the seat so that each of the adjustments in height or inclination is strictly independent.

Preferably, the support side wall constitutes the movable element of a slideway guiding the longitudinal displacement of the whole of the seat structure.

It is thus possible to construct with no important modification a seat structure capable of assuming very diverse positions or merely a seat structure capable of being adjusted in height or in inclination or even displaced longitudinally.

The following description of an embodiment, which is given as a non-limiting example and illustrated in the accompanying drawings, will bring out the features and advantages of the invention.

In the drawings:

FIG. 5 is a sectional view to an enlarged scale taken on line 5—5 of FIG. 3 of details;

FIG. 6 is a diagrammatic side elevational view of a position locking system, and FIG. 7 is a sectional view taken on line 7—7 of FIG. 6.

Figure 2:
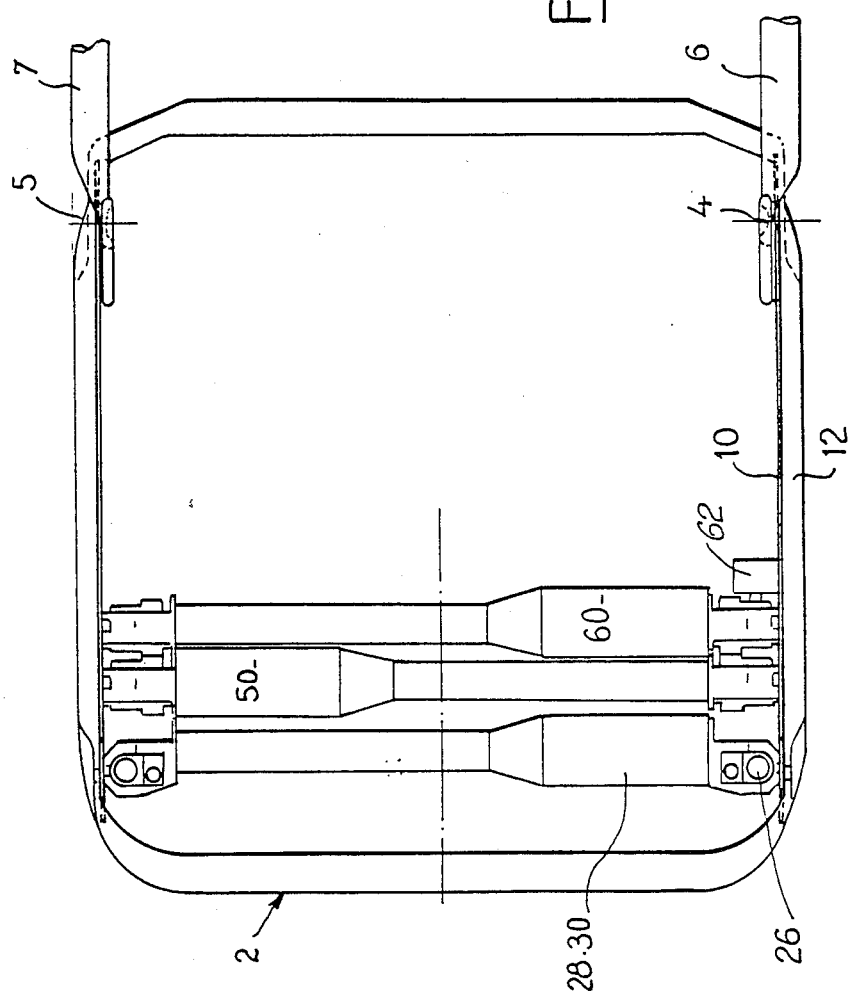
FIG. 2 is a diagrmmatic plan view of the seat framework of the seat structure showing the motor systems.

The illustrated seat structure which is particularly adapted to be mounted in a motor vehicle comprises a seat 1 whose framework comprises a frame 2 formed, for example, by a tube which is bent onto itself and welded at its ends. Pivotally mounted at the rear of this frame 2 (FIG. 2) at 4 and 5 are two lateral branches 6 and 7 of a tube bent into a U shape which constitutes the framework of a backrest 8.

Each of the pins 4 and 5 connecting the framework of the backrest to the framework of the seat extends, between these two elements, through a support side wall 10 which extends in a direction parallel to the corresponding lateral tube 12 of the frame 2 of the seat, substantially throughout the length of this tube. In the illustrated embodiment, the side wall 10 has two upwardly extending legs of which one, 14, is located at the rear of the seat and is traversed by the pivot pin 4 or 5 of the seat back, while the other, 16, located in the front part of the seat 1, is traversed by a pin 18 fixing the corresponding tube 12 to the side wall 10.

Figure 3:
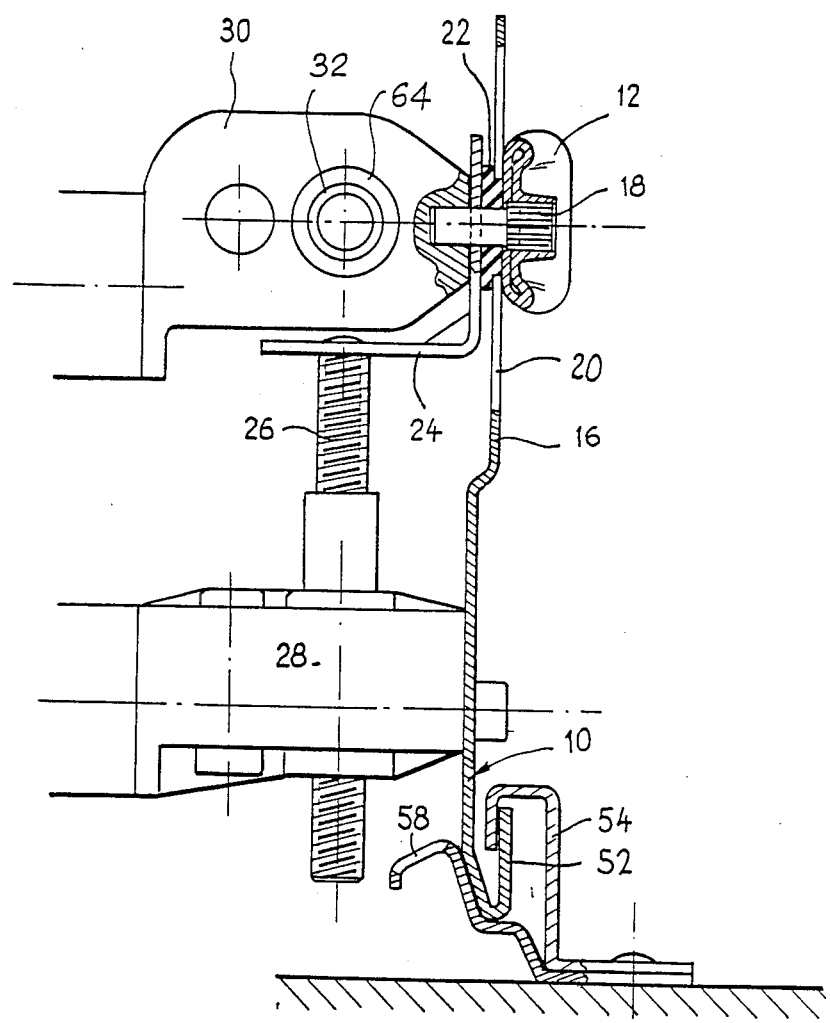
FIG. 3 is a sectional view taken on line 3—3 of FIG. 1.

In fact, as shown more particularly in FIG. 3, the pin 18 extends through a vertical opening 20 in the leg 16 of the side wall 10. It is guided in this opening by a washer 22 of a plastics or like material provided with a transverse slot 23 and connected to a plate 24 which is vertically movable under the action of a screwthreaded rod 26 driven by a control element or motor-speed reducer unit 28 itself pivotally mounted on the side wall 10. The frame 2 of the seat framwork is symmetrical with respect to the longitudinal axis of the seat and the motor-speed reducer unit 28 is pivotally mounted between the two side walls 10 connected to this frame and preferably drives simultaneously the screwthreaded rods 26 mounted on both sides of the seat structure so that a single control causes the uniform vertical displacement of the two sides of the front of the seat, i.e. the sliding of the two washers 22 carrying the two pins 18 in the openings 20 and the pivoting of the whole of the frame 2 about the pivot pins 4 and 5 mounted on the backrest.

The pin 18 also serves as a support for a second control element or motor-speed reducer unit 30 which is capable of pivoting thereon and drives, through for example a direction-changing device and a worm, a link 32 connected to the lower part 38 of a flat tab 34 extending each of the lateral arms 6 and 7 of the framework of the backrest. The motor-speed reducer unit 30 can thus control, through the link 32, the pivoting of the backrest relative to the seat frame about its pivot pins 4 and 5. This axial displacement of the link 32 brings about the displacement of the end 38 of the tab 34 and causes the pivoting of the motor-speed reducer unit 30 about the pin 18 but does not result in any displacement in height of this pin so that the position of the seat remains strictly unchanged.

Figure 1:
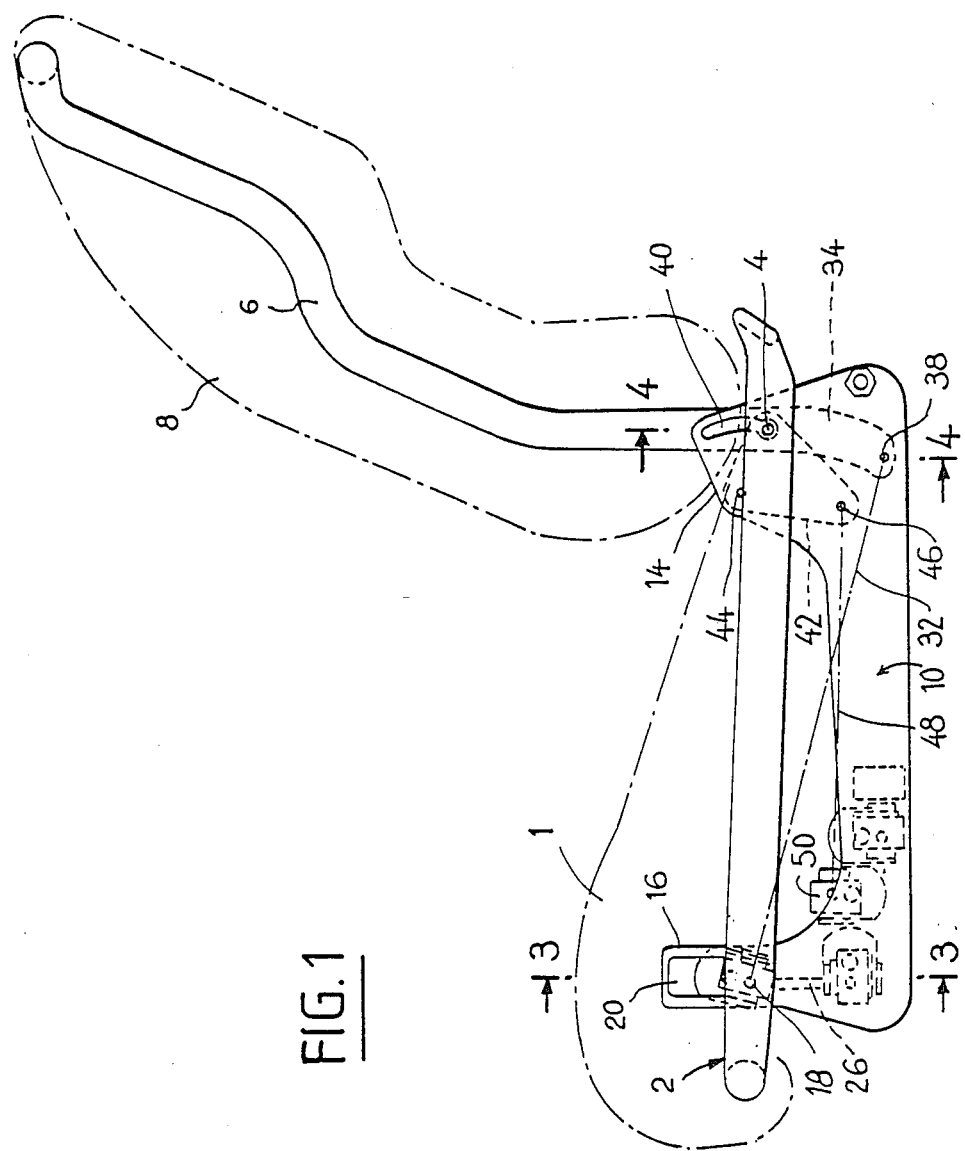
FIG. 1 is a diagrammatic side elevational view of a seat structure according to the invention.
Figure 4:
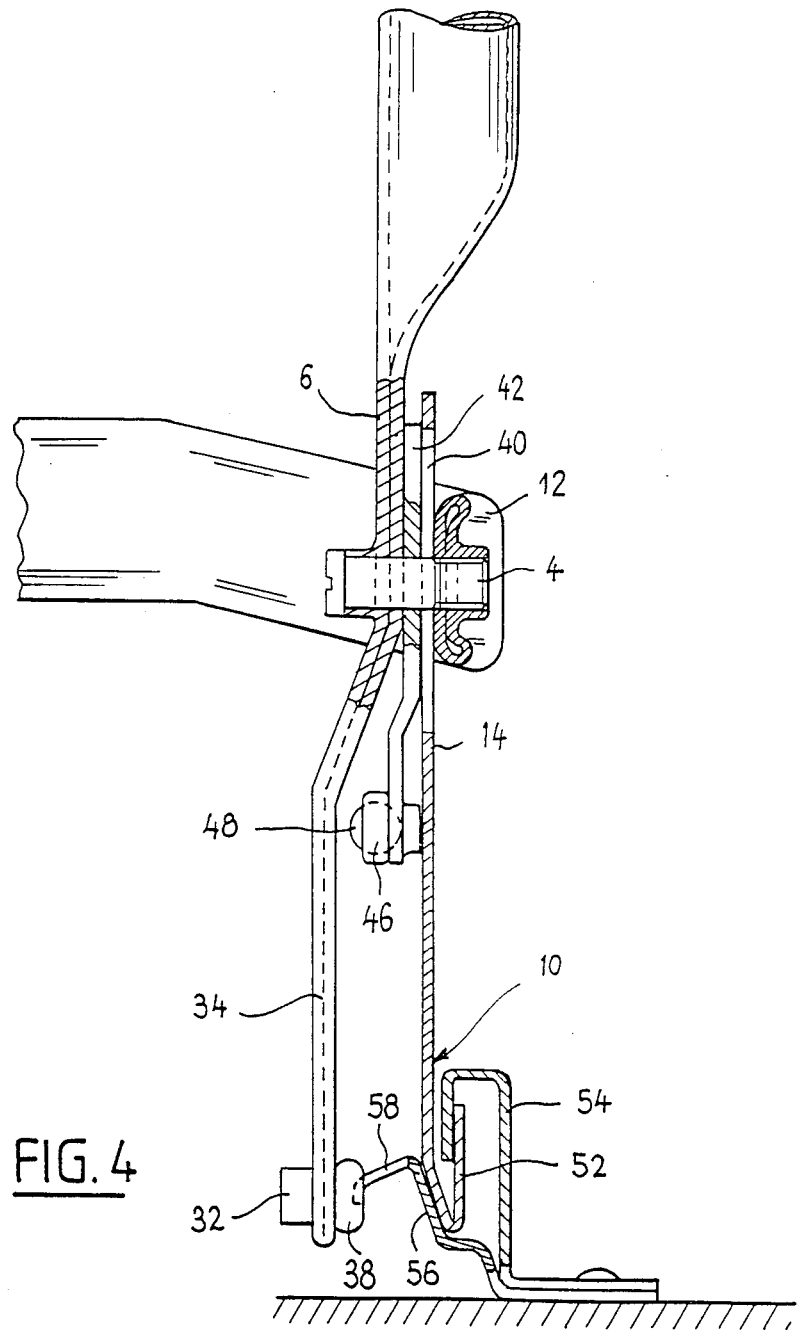
FIG. 4 is a sectional view taken on line 4—4 of FIG. 1.

Each of the pivot pins 4 and 5 between the backrest and the seat is movable in an opening 40 provided in the rear leg 14 of the side wall 10. This opening is substantially vertical but slightly curved, its concavity facing toward the front leg 16 of the side wall. Further, a triangular plate 42 is interposed between the leg 14 of the side wall 10 and the corresponding arm 6 or 7 of the framework of the backrest, as shown more particularly in FIGS. 1 and 4. This plate 42, through which the pin 4 or 5 extends, is pivotally mounted at 44 on the leg 14 of the side wall 10 and is moreover pivotally mounted in its lower part on the end 46 of a screwthreaded link 48 driven by a control element or a motor-speed reucer unit 50 pivotally mounted on the side wall. The displacement of the link 48 causes the plate 42 to pivot about its pivotal connection 44 on the side wall and consequently shifts the pin 4 or 5 in the opening 40 in the side wall 10 which is centered on the pin 44. For example, when the link 48 is urged toward the right, as viewed in FIG. 1, the pin 4 is urged upwardly in the opening 40 and this raises the whole of the rear of the seat structure, i.e. both the rear end of the framework 2 of the seat and the frame of the backrest 8. In the course of this movement, the end tabs 34 of the lateral arms 6 and 7 of the framework of the backrest are also raised and undergo the same movement as the pins 4 and 5. The link 32 then pivots about the pin 38 while the pin 18 moves in the openings 60 and 20. The triangle formed by the three pins 18, 4 and 38 thus moves without being deformed so that the inclination of the backrest relative to the seat is maintained.

In the same way, when the front of the seat is raised under the action of the screwthreaded rod 26, the pin 18 describes an arc of a circle by moving horizontally in the slot 23 as it moves vertically in the opening 20. The triangle formed by the pins 18, 4 and 38 pivots but does not deform and the inclination of the backrest relative to the seat remains unchanged. .

The various adjustments of the seat structure, i.e. the adjustment in the height and the adjustment of the inclination of the seat and of the backrest are thus completely independent, so that a user may modify at any moment one of these elements without fear of losing the comfort afforded by the other.

Preferably, the support side wall 10 is formed by the movable element of a slideway for the longitudinal displacement of the whole of the seat structure. Thus, as shown more particularly in FIGS. 3 and 4, the side wall 10 comprises for example in its lower part a laterally and upwardly bent flange 52 which cooperates with a section member 54 fixed to the floor of the vehicle and performing the function of the fixed element of the slide. The section member 54 may be completed by a fixed ramp 56 on which the curved end portion of the side wall 10 slides so as to ensure a precise and regular displacement. The ramp 56 is extended by a flange 58 provided with notches or the like and forming a rack in which engages a locking member of any known type which has not been shown in order to avoid complicating the drawing.

The longitudinal displacement of the seat structure is preferably controlled by a motor-speed reducer unit 60 mounted between the two support side walls 10 in the same way as the motor-speed reducer units 50, 28 and 30. This adjustment is, as the foregoing adjustments, completely independent and results in no modification of the height or inclination of the seat structure.

The motors 60, 50, 28 and 30 are preferably electric motors, but they may be of course formed by any suitable driving system controlled manually or automatically.

According to a modification, any one of these driving systems or even all of them may be replaced by a locking system, for example as shown in FIG. 7. Each support side wall 10 carries a housing 70, the two housings being connected by a slidable rod 72 provided at one end with a control push-member (not shown). The rod 72 is connected to a pawl or the like 74 which normally engages with the teeth of a rack 76 carried by the control link, for example the link 32 providing the connection with the tab 34 of the backrest. A spring 78 is operative between the housing and the pawl so as to maintain the latter in engagement with the teeth of the rack. Each housing 70 in this case is of course pivotally mounted on the pin 18 and carried by the plate 24 in the same way as the motor-speed reducer unit 30.

The axial displacement of the rod 72 under the action of the push-member against the action of the spring 78, disengages the pawl from the rack and releases the latter. It is then sufficient for the user to act on the backrest so as to give it the desired inclination, the pawl immobilizing it in this position when the push-member is released. Preferably, a spring 80 mounted on the rack between an abutment 81 of the latter and the housing 70 enables the weight of the element to be displaced to be compensated and thus facilitates the adjustment.

It will also be clear to constructors that either one of the systems for adjusting the position may be easily eliminated without resulting in important modifications in the construction of the seat structure. Consequently, the same type of seat structure may easily be used for all the applications. The control of the inclination, the adjustment in height or the longitudinal displacement being mounted or not mounted, according to needs. Such a possibility of adaptation greatly facilitates mass-production and permits an important reduction in the cost price of the assembly, while affording a notably improved comfort to the user.

What is claimed is:

1. A seat structure for a vehicle, said structure comprising two support side walls for mounting on the vehicle, a backrest framework, a seat framework having a front end and a rear end, and the following component parts provided on each side of the seat structure: a first pivot pin located adjacent the rear end of the seat framework pivotally connecting the backrest framework to the seat framework, a system for adjusting the inclination of the backrest framework relative to the seat framework extending downwardly from said first pin, a control element connected to said lower end portion of the backrest framework, and a second pivot pin located adjacent to the front end of the seat framework pivotally mounting the first control element on the seat framework, a substantially vertical and slightly curved opening in the respective side wall in which said first pin is movably and guidedly engaged, means for mounting said second pin on the respective side wall, and a second control element connected to said first pivot pin for shifting said first pin in said opening and adjusting the height of the rear end of the seat framework relative to the respective support side wall, whereby the adjustment of the inclination of the backrest framework and the adjustment of the height of the rear end of the seat framework are independent from each other.

2. A seat structure to claim 1, wherein the respective support side wall defines a vertical second opening adjacent to the front end of the seat framework and said means mounting the second pin on the respective support side are slidably mounted in the second opening and allow a slight movement of the second pivot pin relative to the support side wall transversely of the vertical second opening, and a third control element connected to the second pivot pin for shifting said second pivot pin in the second opening and adjusting the height of the seat framework relative to the support side wall, whereby the three adjustments of the seat structure relating to the three control elements are independent from one another.

3. A seat structure according to claim 1, wherein said means for mounting the second pin on the respective support side wall comprise a plate which is vertically movable and guided in the vertical second opening and the second pin is mounted to be movable on the plate in a direction transverse to the vertical second opening.

4. A seat structure according to claim 1, comprising, a plate pivotally mounted on the respective support side wall and carrying said first pivot pin, and a link connecting the plate to said second control element for adjusting the angular position of the plate and the height of the rear of the seat framework.

5. A seat structure according to claim 4, wherein said lower portion of the backrest framework is flattened and the plate is interposed between the respective support side wall and said flattened lower portion, the seat framework being located on the opposite side of the respective support side wall relative to the backrest framework.

6. A seat structure according to claim 4, wherein at least one of the first and second control elements is a driving system controlling the corresponding adjustment.

7. A seat structure according to claim 4, wherein at least one of the first and second control elements is a system for locking the adjustment effected.

8. A seat structure according to claim 1, wherein each support side wall constitutes a movable element of a slide structure for guiding a longitudinal displacement of the seat structure relative to the vehicle.

9. A seat structure according to claim 8, wherein each support side wall includes in a lower part a formed-over flange which cooperates with a fixed guiding section member.

10. A seat structure according to claim 1, wherein said first and second control elements are motor-speed reducer units located between the two lateral support side walls under the seat framework and simultaneously controlling the adjustments of the backrest framework and seat framework on both sides of the seat structure.

* * * * *